United States Patent
Hazel et al.

(10) Patent No.: US 7,354,651 B2
(45) Date of Patent: Apr. 8, 2008

(54) BOND COAT FOR CORROSION RESISTANT EBC FOR SILICON-CONTAINING SUBSTRATE AND PROCESSES FOR PREPARING SAME

(75) Inventors: Brian Thomas Hazel, West Chester, OH (US); Irene Spitsberg, Loveland, OH (US); Brett Allen Boutwell, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 10 days.

(21) Appl. No.: 11/150,097

(22) Filed: Jun. 13, 2005

(65) Prior Publication Data

US 2006/0280952 A1    Dec. 14, 2006

(51) Int. Cl.
  *B32B 9/04* (2006.01)
  *B32B 13/04* (2006.01)
  *B32B 15/04* (2006.01)
  *B32B 5/14* (2006.01)
  *F01D 5/14* (2006.01)

(52) U.S. Cl. .............. 428/446; 428/632; 428/641; 428/215; 428/334; 416/241 R

(58) Field of Classification Search ............ 428/641, 428/446, 450, 632, 633, 335, 334, 220, 215, 428/216; 416/241 R, 241 B, 229 R
See application file for complete search history.

(56) References Cited

U.S. PATENT DOCUMENTS

| | | |
|---|---|---|
| 3,415,672 A | 12/1968 | Levinstein et al. |
| 3,540,878 A | 11/1970 | Levine et al. |
| 3,598,638 A | 8/1971 | Levine |
| 3,667,885 A | 6/1972 | Levine et al. |
| 3,993,844 A | 11/1976 | Kiger et al. |
| 4,590,095 A | 5/1986 | Park |
| 4,713,302 A | 12/1987 | Komatsu |
| 4,741,286 A | 5/1988 | Itoh et al. |
| 4,889,776 A * | 12/1989 | Priceman ............. 428/629 |
| 4,921,822 A | 5/1990 | Luthra |
| 5,047,612 A | 9/1991 | Savkar et al. |
| 5,332,598 A | 7/1994 | Kawasaki et al. |
| 5,645,893 A | 7/1997 | Rickerby et al. |
| 5,660,885 A | 8/1997 | Hasz et al. |
| 5,716,720 A | 2/1998 | Murphy |
| 5,741,596 A | 4/1998 | Skowronski et al. |
| 5,805,973 A | 9/1998 | Coffinberry et al. |
| 5,869,146 A | 2/1999 | McCluskey et al. |
| 5,985,470 A | 11/1999 | Spitsberg et al. |

(Continued)

OTHER PUBLICATIONS

U.S. Appl. No. 11/084,104, filed Mar. 21, 2005, Spitsberg et al.

(Continued)

*Primary Examiner*—Michael E. Lavilla
(74) *Attorney, Agent, or Firm*—Marcella R. Louke; William Scott Andes

(57) ABSTRACT

An article comprising a silicon-containing substrate, a silicide-containing bond coat layer overlying the substrate, and an environmental barrier coating (EBC) overlying the bond coat layer, wherein the EBC comprises a corrosion resistant outer layer comprising a corrosion resistant metal silicate. A process is also provided for forming the corrosion resistant outer layer over the silicide-containing bond coat layer.

20 Claims, 2 Drawing Sheets

U.S. PATENT DOCUMENTS

| | | |
|---|---|---|
| 6,025,078 A | 2/2000 | Rickerby et al. |
| 6,117,560 A | 9/2000 | Maloney |
| 6,129,954 A | 10/2000 | Spitsberg et al. |
| 6,146,696 A | 11/2000 | Das et al. |
| 6,177,200 B1 | 1/2001 | Maloney |
| 6,284,323 B1 | 9/2001 | Maloney |
| 6,284,325 B1 | 9/2001 | Eaton, Jr. et al. |
| 6,291,014 B1 | 9/2001 | Warnes et al. |
| 6,296,941 B1 | 10/2001 | Eaton, Jr. et al. |
| 6,296,942 B1 | 10/2001 | Eaton, Jr. et al. |
| 6,299,988 B1 | 10/2001 | Wang et al. |
| 6,312,763 B1 | 11/2001 | Eaton, Jr. et al. |
| 6,319,614 B1 | 11/2001 | Beele |
| 6,326,057 B1 | 12/2001 | Das et al. |
| 6,332,931 B1 | 12/2001 | Das et al. |
| 6,333,118 B1 | 12/2001 | Alperine et al. |
| 6,335,105 B1 | 1/2002 | McKee |
| 6,387,456 B1 | 5/2002 | Eaton, Jr. et al. |
| 6,387,526 B1 | 5/2002 | Beele |
| 6,410,148 B1 | 6/2002 | Eaton, Jr. et al. |
| 6,444,335 B1 | 9/2002 | Wang et al. |
| 6,485,848 B1 | 11/2002 | Wang et al. |
| 6,558,814 B2 | 5/2003 | Spitsberg et al. |
| 6,562,409 B2 | 5/2003 | Koshkarian et al. |
| 6,579,633 B2 | 6/2003 | Kim et al. |
| 6,607,852 B2 | 8/2003 | Spitsberg et al. |
| 6,610,370 B2 | 8/2003 | Wang et al. |
| 6,617,036 B2 | 9/2003 | Eaton, Jr. et al. |
| 6,617,037 B2 | 9/2003 | Sun et al. |
| 6,699,607 B1 | 3/2004 | Spitsberg |
| 6,733,908 B1 | 5/2004 | Lee et al. |
| 6,759,151 B1 | 7/2004 | Lee |
| 6,777,093 B1 | 8/2004 | Ojard et al. |
| 6,780,476 B2 | 8/2004 | Horikawa |
| 6,787,195 B2 | 9/2004 | Wang et al. |
| 6,820,334 B2 | 11/2004 | Kebbede et al. |
| 6,844,075 B1 | 1/2005 | Saak et al. |
| 2002/0136835 A1 | 9/2002 | Li et al. |
| 2003/0003328 A1 | 1/2003 | Spitsberg et al. |
| 2003/0035907 A1 | 2/2003 | Campbell et al. |
| 2003/0113559 A1 | 6/2003 | Eaton et al. |
| 2003/0224142 A1 | 12/2003 | Lau et al. |
| 2004/0028941 A1 | 2/2004 | Lane et al. |
| 2004/0043149 A1 | 3/2004 | Gordon et al. |
| 2004/0062954 A1 | 4/2004 | Wang et al. |
| 2004/0151840 A1 | 8/2004 | Wang et al. |
| 2004/0234782 A1 | 11/2004 | Sun |
| 2004/0234783 A1 | 11/2004 | Eaton et al. |
| 2005/0074625 A1 | 4/2005 | Meschter et al. |

OTHER PUBLICATIONS

U.S. Appl. No. 11/083,970, filed Mar. 21, 2005, Govern et al.
U.S. Appl. No. 11/150,098, filed Jun. 13, 2005, Hazel et al.
U.S. Appl. No. 11/150,099, filed Jun. 13, 2005, Spitsberg et al.
U.S. Appl. No. 11/150,100, filed Jun. 13, 2005, Spitsberg et al.

* cited by examiner

BOND COAT FOR CORROSION RESISTANT EBC FOR SILICON-CONTAINING SUBSTRATE AND PROCESSES FOR PREPARING SAME

BACKGROUND OF THE INVENTION

This invention broadly relates to an article comprising: a silicon-containing substrate; an overlaying silicide-containing bond coat layer; and an overlaying environmental barrier coating (EBC) that includes a corrosion resistant outer layer comprising a corrosion resistant metal silicate. This invention further broadly relates to processes for forming the corrosion resistant outer layer of the EBC over the silicide-containing bond coat layer.

Higher operating temperatures for gas turbine engines are continuously sought in order to increase their efficiency. However, as operating temperatures increase, the high temperature durability of the components of the engine must correspondingly increase. Significant advances in high temperature capabilities have been achieved through formulation of iron, nickel and cobalt-base superalloys. While superalloys have found wide use for gas turbine components used throughout gas turbine engines, and especially the higher temperature sections, alternative lighter weight substrate materials have been proposed and sought.

Ceramic materials containing silicon, such as those comprising silicon carbide (SiC) as a matrix material and/or as a reinforcing material (e.g., as fibers) are currently being used as substrate materials for higher temperature applications, such as gas turbine engines, heat exchangers, internal combustion engines, etc. These silicon-containing matrix/reinforcing materials are commonly referred to as ceramic matrix composites (CMCs). These silicon-containing materials used as matrix materials and/or as reinforcing materials can decrease the weight yet maintain the strength and durability of turbine components comprising such substrates, and are currently being considered for many gas turbine components used in higher temperature sections of gas turbine engines, such as turbine components comprising airfoils (e.g., compressors, turbines, vanes, etc.), combustors, and other turbine components for which reduced weight is desirable.

As operating temperatures increase, the high temperature durability of such CMC materials must also correspondingly increase. In many applications, a protective coating is beneficial or required for such silicon-containing substrates. Such coatings should provide environmental protection by inhibiting the major mechanism for degradation of silicon-containing materials in a corrosive water-containing environment, namely, the formation of volatile silicon monoxide (SiO) and silicon hydroxide ($Si(OH)_4$) products. Consequently, a necessary requirement of an environmental barrier coating (EBC) system for a silicon-containing substrate is stability in high temperature environments containing water vapors. Other important properties for these coating systems can include a coefficient of thermal expansion (CTE) compatible with the silicon-containing substrate, low permeability for oxidants, low thermal conductivity, and chemical compatibility with the silicon-containing substrate and overlaying silica scale formed typically by oxidation.

Various single-layer and multilayer EBC systems have been investigated, but each has exhibited shortcomings relating to environmental protection and compatibility with silicon-containing substrates. For example, EBC systems have been suggested for protecting silicon-containing CMC substrates from oxidation at high temperatures and degradation in the presence of aqueous environments (e.g., steam). These steam-resistant EBC systems include those comprising mullites ($3Al_2O_3.2SiO_2$) disclosed in, for example, commonly-assigned U.S. Pat. No. 6,129,954 (Spitsberg et al.), issued Oct. 10, 2000, and U.S. Pat. No. 5,869,146 (McCluskey et al.), issued Feb. 9, 1999. Other steam-resistant EBC systems comprising barium strontium aluminosilicate (BSAS), with or without mullite, and with or without additional thermal barrier coatings are disclosed in, for example, commonly-assigned U.S. Pat. No. 5,985,470 (Spitsberg et al.), issued Nov. 16, 1999; U.S. Pat. No. 6,444,335 (Wang et al.), issued Sep. 3, 2002; U.S. Pat. No. 6,607,852 (Spitsberg et al.), issued Aug. 19, 2003; and U.S. Pat. No. 6,410,148 (Eaton et al.), issued Jun. 25, 2002.

One version of these steam-resistant EBCs comprise an essentially three-layer system of: (1) a silicon bond coat layer adjacent the silicon-containing substrate; (2) a combination mullite-BSAS (e.g., 80% mullite-20% BSAS) transition layer overlaying and adjacent the bond coat layer; and (3) an outer barrier layer comprising BSAS. See, e.g., commonly assigned U.S. Pat. No. 6,410,148 (Eaton et al.), issued Jun. 25, 2002. The silicon bond coat layer provides good adhesion to the silicon-containing substrate (e.g., a SiC/SiC CMC substrate) and can also function as a sacrificial oxidation layer. The mullite-BSAS transition layer prevents rapid reaction between the outer barrier layer comprising BSAS and the underlying silica scale that typically forms on the silicon bond coat layer. The outer barrier layer comprising BSAS is relatively resistant to steam and other high temperature aqueous environments.

These steam-resistant EBCs comprising BSAS are typically deposited on the silicon-containing CMC substrates by thermal spray techniques such as plasma spraying. Plasma spraying tends to form relatively thick coatings or layers that may not be suitable for certain applications. In addition, these steam-resistant EBCs comprising BSAS may also not be sufficiently resistant to other forms of environmental attack.

These steam-resistant three-layer EBC systems were originally developed for gas turbine component applications where the EBC surface temperature of the silicon-containing CMC substrate did not exceed about 2200° F. (1204° C.). Future gas turbine component applications are expected to increase the EBC surface temperature of the silicon-containing CMC substrate well above about 2200° F. (1204° C.).

Some thermal insulation from these expected higher surface temperatures can be addressed by including one or more thermal barrier coating (TBC) layers on top of the three-layer EBC system. See commonly assigned U.S. Pat. No. 6,444,335 (Wang et al.), issued Sep. 3, 2002 (T/EBC system that comprises a thermal insulating YSZ top coat layer overlying an intermediate layer containing YSZ and BSAS, mullite and/or alumina that overlies a mullite-containing layer that can be adhered to the silicon-containing substrate by an optional silicon layer.) Even with these additional TBC layers, the silicon-containing CMC substrate, as well as the silicon bond coat layer, is still expected to experience effective temperatures well above about 2200° F. (1204° C.).

Accordingly, it would be desirable to be able to provide an environmental barrier coating (EBC) for silicon-containing (e.g., CMC) substrates that can be formed to: (1) provide coating thicknesses that are thinner than those provided by thermal spray techniques such as plasma spray; and/or (2) are resistant to environmental attack by other corrosive agents besides high temperature aqueous environments (e.g., steam). It would further be desirable to be able to provide a bond coat layer that can adhere such an EBC to the silicon-containing (e.g., CMC) substrate, even when experiencing effective interface surface temperatures between the EBC and the substrate that are well above about 2200° F. (1204° C.).

BRIEF DESCRIPTION OF THE INVENTION

An embodiment of this invention is broadly directed at an article comprising:
  a silicon-containing substrate;
  a silicide-containing bond coat layer adjacent to and overlaying the substrate; and
  an environmental barrier coating overlaying the bond coat layer, wherein the environmental barrier coating comprises a corrosion resistant outer layer comprising a corrosion resistant metal silicate.

Another embodiment of this invention is broadly directed at a process comprising the following steps:
  (a) providing a silicon-containing substrate having a silicide-containing bond coat layer overlaying the substrate; and
  (b) forming over the bond coat layer a corrosion resistant layer comprising a corrosion resistant metal silicate.

Another embodiment of this invention is broadly directed at a process comprising the following steps:
  (a) providing a silicon-containing substrate having a silicide-containing bond coat layer over the substrate; and
  (b) forming over the bond coat layer a corrosion resistant layer comprising corrosion resistant metal silicate, wherein the corrosion resistant layer has a thickness of up to about 5 mils (127 microns).

The embodiments of the article and processes of this invention provide a number of advantages and benefits with regard to articles comprising silicon-containing substrates having environmental barrier coatings that provide corrosion protection. The silicide-containing bond coat layer improves the adherence of the environmental barrier coating to the underlying silicon-containing substrate, even at operating temperatures in excess of about 2200° F. (1204° C.), and especially well in excess of about 2200° F. (1204° C.). The silicide-containing bond coat layer can also provide a source of silicon for forming an optional protective silica scale layer thereon, or for forming the corrosion resistant layer comprising the reaction-generated corrosion resistant metal silicate of the environmental barrier coating in the absence of the silica scale layer. Because the silicide-containing bond coat layers comprise metal silicides that are typically much higher melting than prior silicon bond coat layers, the silicide-containing bond coat layer is resistant to adverse affects on its adherence and other mechanical properties, even when experiencing operating temperatures above about 2200° F. (1204° C.). Embodiments of the processes of this invention can also form the outer corrosion resistant layer of the environmental barrier coating as a relatively thin layer, e.g., having a thickness of up to about 5 mils (127 microns).

DETAILED DESCRIPTION OF THE INVENTION

Figure 1:
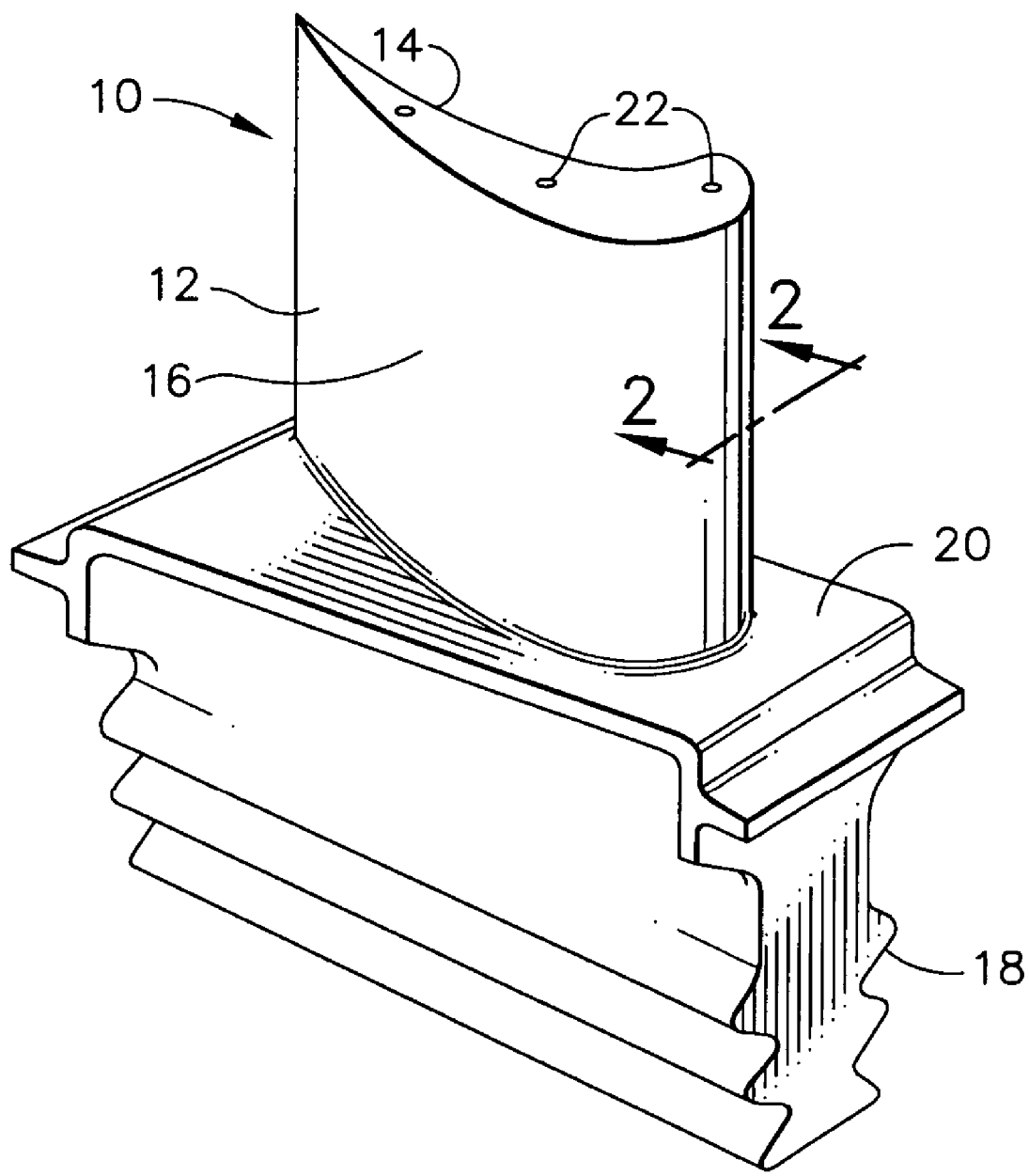
FIG. 1 is a perspective view of a turbine blade for which embodiments of this invention comprising the environmental barrier coating, silicide-containing bond coat layer and silicon-containing substrate are useful.

As used herein, the term "environmental barrier coating" (hereafter "EBC") refers to those coating systems that can provide environmental protection for the underlying silicide-containing bond coat layer and silicon-containing substrate against various types of environmental attack, and are chemically compatible (e.g., relatively inert, etc.) with regard to the underlying silicide-containing bond coat layer. The various types of environmental attack that the environmental barrier coating protects against include those caused by high temperature, aqueous environments (e.g., steam), other environmental contaminant compositions and corrosive agents, for example those that are formed from oxides of calcium, magnesium, etc., or mixtures thereof, as well as sulfates and/or chlorides of calcium, magnesium, sodium, etc., or mixtures thereof, etc. These oxides, sulfates, and/or chlorides of calcium, magnesium, sodium, etc., or mixtures thereof can come from ingested sea salt or a contaminant composition comprising mixed calcium-magnesium-aluminum-silicon-oxide systems (Ca—Mg—Al—SiO), that are commonly referred to as "CMAS." See, for example, U.S. Pat. No. 5,660,885 (Hasz et al.), issued Aug. 26, 1997, which describes these CMAS environmental contaminant compositions. The EBC comprises an outer corrosion resistant layer, plus one or more optional layers.

As used herein, the term "corrosion resistant layer" refers to one or more layers comprising a sufficient amount or level of corrosion resistant metal silicate to protect against various types of environmental attack, including those caused by high temperature, aqueous environments (e.g., steam), other environmental contaminant compositions and corrosive agents, for example those that are formed from oxides of calcium, magnesium, etc., or mixtures thereof, as well as sulfates and/or chlorides of calcium, magnesium, sodium, etc., or mixtures thereof, mixed calcium-magnesium-aluminum-silicon-oxide systems, such as CMAS, etc. The corrosion resistant layer can comprise at least about 90% corrosion resistant metal silicate, typically at least about 95% corrosion resistant metal silicate, and more typically 99% corrosion resistant metal silicate.

As used herein, the term "corrosion resistant metal silicate" refers to a metal silicate that is at least resistant to environmental attack caused by sulfates and/or chlorides of calcium, magnesium, sodium, etc., or mixtures thereof (e.g., from sea salt), oxides of calcium, magnesium, etc., or mixtures thereof (e.g., such as CMAS), etc. These metal silicates can also be resistant to environmental attack caused by other environmental contaminant compositions and corrosive agents, including high temperature, aqueous environments (e.g., steam), etc. Suitable corrosion resistant metal silicates for use herein can include yttrium silicates, scandium silicates, zirconium silicates, hafnium silicates, rare earth metal silicates such as lanthanum silicates, cerium silicates, praseodymium silicates, neodymium silicates, promethium silicates, samarium silicates, europium silicates, gadolinium silicates, terbium silicates, dysprosium silicates, holmium silicates, erbium silicates, thulium silicates, ytterbium silicates, lutetium silicates, etc., as well as various combinations of these metal silicates. The metal silicates can be in the form of a monosilicate, a disilicate, an orthosilicate, a metasilicate, a polysilicate, etc., or combinations thereof. Typically, the corrosion resistant metal silicate is a yttrium silicate, a scandium silicate, a lutetium silicate, a ytterbium silicate, a zirconium silicate, a hafnium silicate, or a combination thereof, and more typically a yttrium silicate, ytterbium silicate, or a lutetium silicate.

As used herein, the term "reaction-generated corrosion resistant metal silicate" refers to any corrosion resistant metal silicate that is formed by the reaction of a metal source and a silica source. The reaction-generated corrosion resistant metal silicate can be formed as a reaction product between a metal source (e.g., a metal oxide, metal nitrate, metal chloride, etc.) and a silica source that can come from, for example, from silica powder that is simply mixed, blended or otherwise combined with the metal source (e.g., metal oxide) and then reaction-bonded to the surface of the silicide-containing bond coat layer. Alternatively, the source of silica can come from the silicide-containing bond coat layer, from a silica layer overlaying and typically adjacent to the silicide-containing bond coat layer, for example, a silica scale layer that forms naturally from the silicide-containing bond coat layer or that is formed intentionally or deliberately from the silicide-containing bond coat layer, e.g., by pre-oxidizing a portion of the silicide-containing bond coat layer to form a silica scale layer thereon, by depositing silicon on the silicide-containing bond coat layer and then preoxidizing the deposited silicon to form a silica scale layer; by depositing silica on the silicide-containing bond coat layer to form a silica scale layer, etc.

As used herein, the term "silicide-containing bond coat layer" refers to any bond coat layer that promotes, improves, etc., adhesion of the overlaying EBC system to the silicon-containing substrate, and which comprises a silicon metal alloy (also referred to herein as a "metal silicide"). Typically, the silicide-containing bond coat layer comprises a metal silicide having a melting point of at least about 2800° F. (1537° C.), more typically at least about 3000° F. (1648° C.). These metal silicides can be monosilicides, disilicides, trisilicides, etc., and can be silicides of chromium, molybdenum, niobium, tantalum, titanium, tungsten, zirconium, rare earths (lanthanum, cerium, praseodymium, neodymium, promethium, samarium, europium, gadolinium, terbium, dysprosium, holmium, erbium, thulium, ytterbium, lutetium, etc.), etc., or compatible combinations thereof. Suitable metal silicides for use herein include titanium trisilicide, titanium disilicide, chromium trisilicide, molybdenum trisilicide, molybdenum disilicide, niobium trisilicide, niobium disilicide, hafnium disilicide, tantalum trisilicide, tantalum disilicide, tungsten disilicide, zirconium disilicide, rare earth disilicides and trisilicides such as gadolinium disilicide, lanthanum disilicide, neodymium silicide, ytterbium trisilicide, etc., or compatible combinations thereof.

As used herein, the term "silicon-containing substrate" refers to any silicon-containing-substrate, including those comprising silicon-containing ceramic materials, metal silicides (if compositionally different from those comprising the silicide-containing bond coat layer), or combinations of such silicon-containing ceramic materials and silicon metal alloys. The silicon-containing substrate can comprise a substantially continuous matrix of silicon-containing materials, can be a composite comprising a continuous matrix of silicon-containing materials reinforced with discrete elements such as fibers, particles, etc. dispersed, embedded, etc., in the continuous matrix, etc. The discrete elements such as fibers, particles, etc., can be formed from silicon-containing ceramic materials, or can be formed from other materials, e.g., carbon fibers. Such combinations of dispersed, embedded, etc., fibers, particles, etc., in a continuous matrix of silicon-containing ceramics are typically referred to as ceramic matrix composites or CMCs. Typical CMCs comprise a continuous silicon-containing ceramic matrix that is fiber reinforced, usually with silicon-based fibers. These reinforcing fibers typically include a coating material that fully covers the fiber surfaces to impart and maintain structural integrity of the composite material systems. Typical fiber coating materials include boron nitride, silicon nitride, silicon carbide, carbon, etc. Suitable silicon-containing ceramic materials include silicon carbide, silicon nitride, silicon carbide nitride, silicon oxynitride, silicon aluminum oxynitride, etc., or combinations thereof. Suitable metal silicides useful as silicon-containing substrates include molybdenum silicides, niobium silicides, iron silicides, etc, or combinations thereof. Illustrative silicon-containing substrates suitable for use herein include silicon carbide coated silicon carbide fiber-reinforced silicon carbide particles and a silicon matrix, a carbon fiber-reinforced silicon carbide matrix, a silicon carbide fiber-reinforced silicon nitride matrix, etc.

As used herein, the term "thermal barrier coating" (hereafter "TBC") refers to those coatings that reduce heat flow to the corrosion resistant metal silicate protective layer, steam-resistant barrier coating, silicon-containing substrate, etc., of the article, i.e., form a thermal barrier, and which comprise ceramic materials have a melting point that is typically at least about 2600° F. (1426° C.), and more typically in the range of from about 3450° to about 4980° F. (from about 1900° to about 2750° C.). Suitable ceramic materials for thermal barrier coatings include, aluminum oxide (alumina), i.e., those compounds and compositions comprising $Al_2O_3$, including unhydrated and hydrated forms, various zirconias, in particular phase-stabilized zirconias (e.g., zirconia blended with various stabilizer metal oxides such as yttrium oxides), such as yttria-stabilized zirconias, ceria-stabilized zirconias, calcia-stabilized zirconias, scandia-stabilized zirconias, magnesia-stabilized zirconias, india-stabilized zirconias, ytterbia-stabilized zirconias, etc., as well as mixtures of such stabilized zirconias. See, for example, Kirk-Othmer's Encyclopedia of Chemical Technology, 3rd Ed., Vol. 24, pp. 882-883 (1984) for a description of suitable zirconias. Suitable yttria-stabilized zirconias can comprise from about 1 to about 20% yttria (based on the combined weight of yttria and zirconia), and more typically from about 3 to about 10% yttria. These phase-stabilized zirconias can further include one or more of a second metal (e.g., a lanthanide or actinide) oxide such as dysprosia, erbia, europia, gadolinia, neodymia, praseodymia, urania, and hafnia to further reduce thermal conductivity of the thermal barrier coating. See U.S. Pat. No. 6,025,078 (Rickerby et al.), issued Feb. 15, 2000 and U.S. Pat. No. 6,333,118 (Alperine et al.), issued Dec. 21, 2001, both of which are incorporated by reference. Suitable ceramic materials for thermal barrier coatings also include pyrochlores of general formula $A_2B_2O_7$ where A is a metal having a valence of 3+ or 2+ (e.g., gadolinium, aluminum, cerium, lanthanum or yttrium) and B is a metal having a valence of 4+ or 5+ (e.g., hafnium, titanium, cerium or zirconium) where the sum of the A and B valences is 7. Representative materials of this type include gadolinium-zirconate, lanthanum titanate, lanthanum zirconate, yttrium zirconate, lanthanum hafnate, cerium zirconate, aluminum cerate, cerium hafnate, aluminum hafnate and lanthanum cerate. See U.S. Pat. No. 6,117,560 (Maloney), issued Sep. 12, 2000; U.S. Pat. No. 6,177,200 (Maloney), issued Jan. 23, 2001; U.S. Pat. No. 6,284,323 (Maloney), issued Sep. 4, 2001; U.S. Pat. No. 6,319,614 (Beele), issued Nov. 20, 2001; and U.S. Pat. No. 6,387,526 (Beele), issued May 14, 2002, all of which are incorporated by reference.

As used herein, the term "CTE" refers to the coefficient of thermal expansion of a material, and is typically defined in units of $10^{-6}/°$ F. or $10^{-6}/°$ C.

As used herein, the term "comprising" means various compositions, compounds, components, coatings, substrates, layers, steps, etc., can be conjointly employed in this invention. Accordingly, the term "comprising" encompasses the more restrictive terms "consisting essentially of" and "consisting of."

All amounts, parts, ratios and percentages used herein are by weight unless otherwise specified.

Previously, bond coat layers for adhering EBC systems (including those having an outer corrosion resistant layer comprising a corrosion resistant metal silicate) to the underlying silicon-containing substrate have comprised silicon. Typically, this relatively thin silicon bond coat layer has a thickness of from about 3 to about 6 mils (from about 76 to about 152 microns). See, for example, commonly assigned U.S. Pat. No. 6,410,148 (Eaton et al.), Jun. 25, 2002.

Bond coat layers of EBCs for silicon-containing substrates used in higher temperature applications can experience effective temperatures above about 2200° F. (3992° C.), and especially well above about 2200° F. (1204° C.), e.g., upwards of about 2400° F. (1315° C.). The embodiments of article and processes of this invention are based on the discovery that the adherence and other mechanical properties of silicon bond coat layers experiencing such higher temperatures can be adversely affected, even though silicon has a melting point of about 2570° F. (1410° C.). For example, such higher temperatures can adversely affect the ability of the silicon bond coat layer to adhere the EBC system to the underlying silicon-containing substrate, as well as cause other mechanical stresses in the EBC system.

The silicide-containing bond coat layers used in the embodiments of the article and processes of this invention solve these problems caused by the bond coat layer experiencing higher effective temperatures above about 2200° F. (1204° C.), and especially well above about 2200° F. (1204° C.), e.g., upwards of about 2400° F. (1315° C.). The metal silicides that these bond coat layers comprise are much higher melting than silicon, e.g., have melting points typically of at least about 2800° F. (1537° C.), more typically at least about 3000° F. (1648° C.). As a result, the silicide-containing bond coat layers of the embodiments of the article and processes of this invention are less susceptible to adverse effects on the mechanical properties (e.g., adherence and stress properties) because of higher temperature exposure, especially compared to silicon bond coat layers.

While providing the ability to effectively handle higher temperatures, the silicide-containing bond coat layers used in the embodiments of the article and processes of this invention retain the other desirable physical and chemical properties of the replaced silicon bond coat layer. For example, the silicide-containing bond coat layer improves the adherence of the corrosion resistant layer-containing EBC system to the underlying silicon-containing substrate. In addition, the silicide-containing bond coat layer can provide a source of silicon for forming an optional protective silica scale layer thereon, or for forming the corrosion resistant layer comprising a reaction-generated corrosion resistant metal silicate of the EBC in the absence of the silica scale layer.

These silicide-containing bond coat layers are useful with a variety of articles for adhering overlaying corrosion resistant layer-containing EBC systems to silicon-containing substrates where the article is operated at, or exposed to, high temperature, corrosive environments, especially higher temperature, corrosive environments that occur during normal gas turbine engine operation. These articles can be in the form of turbine engine (e.g., gas turbine engine) parts and components, including those comprising turbine airfoils such as turbine blades, vanes and blisks, turbine shrouds, turbine nozzles, combustor components such as liners, deflectors and their respective dome assemblies, augmentor hardware of gas turbine engines, etc. The silicide-containing bond coat layers used in the embodiments of the articles of this invention are particularly useful for articles comprising silicon-containing substrates in the form of turbine blades and vanes, and especially the airfoil portions of such blades and vanes. However, while the following discussion of the embodiments of articles of this invention will be with reference to turbine blades and vanes, and especially the airfoil portions thereof, that comprise these blades and vanes, it should also be understood that these silicide-containing bond coat layers can be useful for adhering overlaying corrosion resistant layer-containing EBC systems in other articles comprising silicon-containing substrates.

The various embodiments of this invention are further illustrated by reference to the drawings as described hereafter. Referring to the drawings, FIG. 1 depicts a component article of a gas turbine engine such as a turbine blade or turbine vane, and in particular a turbine blade identified generally as 10. (Turbine vanes have a similar appearance with respect to the pertinent portions.) Blade 10 generally includes an airfoil 12 against which hot combustion gases are directed during operation of the gas turbine engine, and whose surfaces are therefore subjected to potential environmental attack by high temperature aqueous environments (e.g., steam), as well as other environmental contaminants such as CMAS or sea salt. Airfoil 12 has a "high-pressure side" indicated as 14 that is concavely shaped; and a suction side indicated as 16 that is convexly shaped and is sometimes known as the "low-pressure side" or "back side." In operation the hot combustion gas is directed against the high-pressure side 14. Blade 10 is anchored to a turbine disk (not shown) with a dovetail 18 formed on the root section 20 of blade 10. In some embodiments of blade 10, a number of internal passages extend through the interior of airfoil 12, ending in openings indicated as 22 in the surface of airfoil 12. During operation, a flow of cooling air is directed through the internal passages (not shown) to cool or reduce the temperature of airfoil 12.

Figure 2:
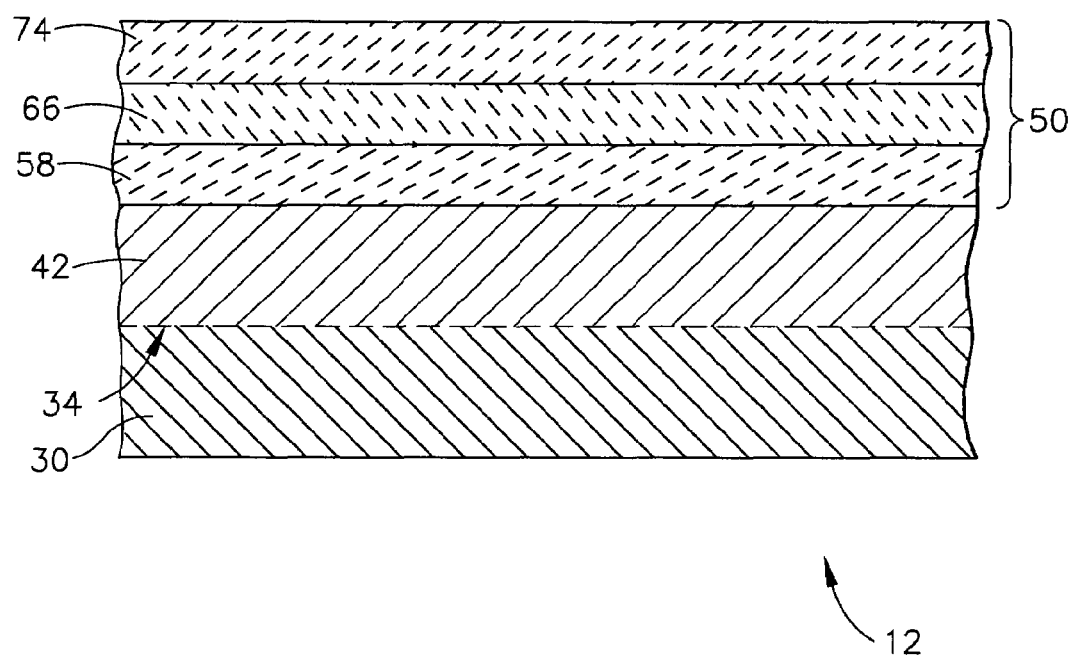
FIG. 2 is an enlarged sectional view through the airfoil portion of the turbine blade of FIG. 1, taken along line 2-2, showing an embodiment of the environmental barrier coating, silicide-containing bond coat layer and silicon-containing substrate of this invention, including an optional overlaying thermal barrier coating (TBC).

Referring to FIG. 2, the base material of airfoil 12 of blade 10 comprising the silicon-containing substrate is indicated generally as 30. Surface 34 of substrate 30 can be pretreated prior to forming the bond coat layer thereon to remove substrate fabrication contamination (e.g., cleaning surface 34) to improve adherence thereto, etc. For example, substrate 30 can be pretreated by subjecting surface 34 to a grit blasting step. This grit blasting step is typically carried out carefully in order to avoid damage to surface 34 of substrate 30 such as silicon carbide fiber reinforced CMC substrate. The particles used for the grit blasting should also be hard enough to remove the undesired contamination but not so hard as to cause significant erosive removal of substrate 30. The abrasive particles typically used in grit blasting are sufficiently small to prevent significant impact damage to surface 34 of substrate 30. When processing a substrate 30, for example, a silicon carbide CMC substrate, grit blasting is typically carried out with alumina particles, typically having a particle size of about 30 microns or less, and typically at a velocity of from about 150 to about 200 m/sec.

As shown in FIG. 2, adjacent to and overlaying surface 34 of substrate 30 is a silicide-containing bond coat layer indicated generally as 42. Bond coat layer 42 typically has a thickness of from about 0.5 to about 10 mils (from about 13 to about 254 microns), more typically from about 1 to about 6 mils (from about 25 to about 152 microns). This bond coat layer 42 can be applied to, deposited or otherwise formed on surface 34 by any process suitable for forming layers from metal silicides, including vapor phase deposition techniques, pack cementation techniques, high velocity oxyfuel (HVOF) techniques, plasma spray techniques, physical vapor deposition (PVD) techniques such as electron beam physical vapor deposition (EB-PVD), ion plasma, etc., thermal spray techniques such as plasma spray (e.g., air plasma spray), etc., chemical vapor deposition (CVD) techniques, etc., as described hereafter for forming thermal barrier coatings, or as well known to those skilled in the art.

As also shown in FIG. 2, adjacent to and overlaying bond coat layer 42 is a corrosion resistant layer-containing environmental barrier coating (EBC) indicated generally as 50. As also shown in FIG. 2, EBC 50 can optionally comprise a protective inner silica scale layer 58. For example, it can be useful to preoxidize a small portion or fraction of the silicide-containing bond coat layer 42 to form a protective inner silica scale layer 58. This preoxidized silica scale layer 58 can be formed, for example, by subjecting the silicide-containing bond coat layer 42 to a temperature of from about 800° to about 1300° C. for from about 15 minutes to about 100 hours.

As shown in FIG. 2, adjacent to and overlaying silica scale layer 58 (or bond coat layer 42 in the absence of silica scale layer 58) is the outer corrosion resistant layer of EBC 50 that is indicated generally as 66. Typically, corrosion resistant outer layer 66 can be formed by simply applying or otherwise depositing a corrosion resistant metal silicate on either the silica scale layer 58, or the bond coat layer 42 in the absence of silica scale layer 58, for example, by the use of conventional coating methods such as physical vapor deposition (PVD) techniques (e.g., electron beam physical vapor deposition (EB-PVD), ion plasma, etc.), thermal spray techniques (e.g., plasma spray such as air plasma spray, etc.), chemical vapor deposition (CVD) techniques, etc., as described hereafter for forming thermal barrier coatings, by deposition from a slurry or gel coating composition of the corrosion resistant metal silicate (e.g., as a powder dispersed in the slurry), followed by heating or firing the deposited powder to fuse or sinter the corrosion resistant layer 66 on silica scale layer 58 or bond coat layer 42, as described hereafter. Alternatively, corrosion resistant layer 66 can be prepared by reacting a metal source (e.g., a metal oxide such as yttria, a metal nitrate, a metal halide, such as a metal chloride, metal fluoride, metal bromide, etc.) with a silica source that can come from, for example, silica powder that is mixed, blended or otherwise combined with the metal source, or alternatively from the silicide-containing bond coat layer 42 (in the absence of silica scale layer 58), from silica scale layer 58, etc.

The corrosion resistant layer 66 can be formed to any desired thickness, the particular thickness typically being dependent on the technique used for forming layer 66. For example, for increased thickness, corrosion resistant layer 66 can be formed by thermal spray techniques such plasma spray (e.g., air plasma spray) to have thicknesses up to about 30 mils (762 microns), and typically in the range from about 1 to about 30 mils (from about 13 to about 762 microns), more typically from about 2 to about 10 mils (from about 25 to about 254 microns). Corrosion resistant layer 66 can also be formed to have a relatively thin thickness, e.g., thicknesses up to about 5 mils (127 microns). When formed as a relatively thin layer, corrosion resistant outer layer 66 can be formed to typically have a thickness of from about 0.5 to about 5 mils (from about 13 to about 127 microns), more typically from about 1 to about 2.5 mils (from about 25 to about 64 microns).

The embodiments of the processes of this invention for forming relatively thin corrosion resistant layers 66 include slurry-gel coating deposition techniques, etc. See commonly assigned U.S. Pat. No. 5,759,032 (Sangeeta et al.), issued Jun. 2, 1998; U.S. Pat. No. 5,985,368 (Sangeeta et al.), issued Nov. 16, 1999; and U.S. Pat. No. 6,294,261 (Sangeeta et al.), issued Sep. 25, 2001 (the relevant portions of which are herein incorporated by reference) for suitable slurry-gel coating deposition techniques. Slurry-gel coating deposition to form relatively thin corrosion resistant layers 66 typically involves depositing particulates (e.g., powders) of the corrosion resistant metal silicates from a slurry or gel coating composition, followed by heating or firing the deposited particulates to a sufficiently high temperature to fuse or sinter the particulates into a cohesive corrosion resistant layer 66.

In addition to the particulates of the corrosion resistant metal silicate, the slurry or gel composition also includes a liquid carrier. Non-limiting examples of liquid carriers include water, lower alcohols (i.e., 1-4 carbon atoms in the main chain) such as ethanol, halogenated hydrocarbon solvents such as tetrachloromethane; and compatible mixtures of any of these substances. Selection of the liquid carrier depends on various factors such as: the evaporation rate required during subsequent processing; the effect of the carrier on the adhesion of the slurry or gel to the underlying layer (e.g., silica scale layer 58 or bond coat layer 42); the solubility of additives and other components in the carrier; the "dispersability" of the particulates (e.g., powders) in the carrier, as well as handling requirements; cost; availability; environmental/safety concerns, etc. The amount of liquid carrier is usually minimized while keeping the particulates of the slurry or gel in suspension. Amounts greater than that level may be used to adjust the viscosity of the slurry or gel composition, depending on the technique used to deposit the particulates from the slurry or gel.

The slurry or gel composition can be deposited by a variety of techniques well known in the art, including slip-casting, brush-painting, dipping, spraying, or spin-coating. Spray-coating is often the easiest way to deposit the particulates from the slurry or gel onto turbine components such as airfoils 12. The viscosity of the slurry or gel coating for spraying can be frequently adjusted by varying the amount of liquid carrier used. After deposition of the particulates from the slurry or gel, the deposited particulates are then heated or fired to a sufficient temperature to fuse or sinter the particulates into a cohesive corrosion resistant sealant layer. The appropriate time/temperature for heating/firing the deposited particulates will of course depend on various factors, including the particular metal silicate particulates in the slurry-gel.

Alternatively, relatively thin corrosion resistant layers 66 can be formed on silica scale layer 58 (or on bond coat layer 42 in the absence of silica scale layer 58) by reaction between the metal source and the silica source (i.e., a reaction-generated corrosion resistant metal silicate), by processes or techniques similar to those used to prepare diffusion coatings (e.g., aluminide diffusion coatings), including chemical vapor deposition (CVD) techniques, pack cementation techniques, etc., well known those skilled in the art. Typically, relatively thin corrosion resistant layers 66 layers are formed by the reaction-bonding of a metal oxide (e.g., yttria) with silica powders, by diffusion sintering of finely divided powders comprising the corrosion resistant metal silicate, etc.

As further shown in FIG. 2, an optional thermal barrier coating (TBC) indicated generally as 74 can be formed on or over corrosion resistant outer layer 66, but can also be provided with additional transition layers therebetween (i.e., between TBC 74 and corrosion resistant outer layer 66) for CTE compatibility. See commonly assigned U.S. Pat. No. 6,444,335 (Wang et al.), issued Sep. 3, 2002 (the relevant portions of which incorporated by reference), for the use of such transition layers comprising BSAS, mullite and/or alumina with TBCs for CTE compatibility.

TBC 74 can have any suitable thickness that provides thermal insulating properties. TBC 74 typically has a thickness of from about 1 to about 30 mils (from about 25 to about 769 microns), more typically from about 3 to about 20 mils (from about 75 to about 513 microns). TBC 74 can be formed (with or without transitional layers) on corrosion resistant outer layer 74 by variety of conventional thermal barrier coating methods. For example, TBC 74 can be formed on corrosion resistant outer layer 74 by physical vapor deposition (PVD), such as electron beam PVD (EB-PVD), filtered arc deposition, or by sputtering. Suitable sputtering techniques for use herein include but are not limited to direct current diode sputtering, radio frequency sputtering, ion beam sputtering, reactive sputtering, magnetron sputtering and steered arc sputtering. PVD techniques can form TBCs 74 having strain resistant or tolerant microstructures such as vertical microcracked structures. EB-PVD techniques can form columnar structures that are highly strain resistant to further increase the coating adherence. See, for example, U.S. Pat. No. 5,645,893 (Rickerby et al.), issued Jul. 8, 1997 (especially col. 3, lines 36-63) and U.S. Pat. No. 5,716,720 (Murphy), issued Feb. 10, 1998) (especially col. 5, lines 24-61) (all of which are incorporated by reference), which disclose various apparatus and methods for applying TBCs by PVD techniques, including EB-PVD techniques.

An alternative technique for forming TBCs 74 is by thermal spray. As used herein, the term "thermal spray" refers to any method for spraying, applying or otherwise depositing TBC 74 that involves heating and typically at least partial or complete thermal melting of the ceramic material and depositing of the heated/melted ceramic material, typically by entrainment in a heated gas stream, onto corrosion resistant outer layer 66. Suitable thermal spray deposition techniques include plasma spray, such as air plasma spray (APS) and vacuum plasma spray (VPS), high velocity oxy-fuel (HVOF) spray, detonation spray, wire spray, etc., as well as combinations of these techniques. A particularly suitable thermal spray deposition technique for use herein is plasma spray. Suitable plasma spray techniques are well known to those skilled in the art. See, for example, Kirk-Othmer Encyclopedia of Chemical Technology, 3rd Ed., Vol. 15, page 255, and references noted therein, as well as U.S. Pat. No. 5,332,598 (Kawasaki et al.), issued Jul. 26, 1994; U.S. Pat. No. 5,047,612 (Savkar et al.) issued Sep. 10, 1991; and U.S. Pat. No. 4,741,286 (Itoh et al.), issued May 3, 1998 (herein incorporated by reference) which describe various aspects of plasma spraying suitable for use herein, including apparatus for carrying out plasma spraying.

While specific embodiments of the this invention have been described, it will be apparent to those skilled in the art that various modifications thereto can be made without departing from the spirit and scope of this invention as defined in the appended claims.

What is claimed is:

1. An article comprising:
   a silicon-containing substrate;
   a silicide-containing bond coat layer overlying the substrate, wherein the bond coat layer comprises a metal silicide selected from the group consisting of a silicide of chromium, tantalum, titanium, tungsten, zirconium, hafnium, a rare earth, and a compatible combination thereof;
   an optional silica scale layer overlaying the bond coat layer; and
   an environmental barrier coating overlying the bond coat layer, wherein the environmental barrier coating comprises a reaction-generated corrosion resistant metal silicate layer wherein the metal silicate is at least one member of the group consisting of a yttrium silicate, a scandium silicate, a zirconium silicate, a hafnium silicate, a rare earth silicate, and combinations thereof, and wherein a silicon source for the reaction-generated metal silicate includes the silica scale layer, if present, or the silicide-containing bond coat layer in the absence of the silica scale layer.

2. The article of claim 1 wherein the bond coat layer is adjacent to the substrate and has a thickness of from about 0.5 to about 10 mils.

3. The article of claim 2 wherein the bond coat layer has a thickness of from about 1 to about 6 mils.

4. The article of claim 1 wherein the corrosion resistant outer layer has a thickness of up to about 30 mils.

5. The article of claim 4 wherein the corrosion resistant outer layer has a thickness of from about 2 to about 10 mils.

6. The article of claim 4 wherein the corrosion resistant outer layer has a thickness of up to about 5 mils.

7. The article of claim 6 wherein the corrosion resistant outer layer has a thickness of from about 1 to about 2.5 mils.

8. The article of claim 1 which is in the form of a turbine component.

9. The article of claim 8 which is a turbine blade.

10. The article of claim 1 wherein the substrate comprises a silicon-containing ceramic material, a silicon metal alloy, or a combination thereof.

11. The article of claim 10 wherein the substrate comprises a continuous matrix of a silicon-containing material reinforced with fibers.

12. The article of claim 11 wherein the substrate comprises a silicon carbide coated silicon carbide fiber-reinforced silicon carbide particles and a silicon matrix, a carbon fiber-reinforced silicon carbide matrix, or a silicon carbide fiber-reinforced silicon nitride matrix.

13. The article of claim 10 wherein the substrate comprises a silicon-containing ceramic material.

14. The article of claim 13 wherein the silicon-containing ceramic material comprises silicon carbide, silicon nitride, silicon carbide nitride, silicon oxynitride, silicon aluminum oxynitride, or a combination thereof.

15. The article of claim 1 wherein the corrosion resistant outer layer comprises at least about 90% by weight corrosion resistant metal silicate.

16. The article of claim 15 wherein the corrosion resistant outer layer comprises at least about 95% by weight corrosion resistant metal silicate.

17. The article of claim 1 wherein the corrosion resistant metal silicate comprises yttrium silicate, ytterbium silicate, or lutetium silicate.

18. The article of claim 1 which further comprises a thermal barrier coating overlaying the corrosion resistant outer layer.

19. The article according to claim 1 wherein the metal silicide is selected from the group consisting of titanium trisilicide, chromium trisilicide, hafnium disilicide, tantalum trisilicide, tantalum disilicide, tungsten disilicide, zirconium disilicide, gadolinium disilicide, lanthanum disilicide, neodymium silicide, ytterbium trisilicide, and a compatible combination thereof.

20. An article comprising:
   a silicon-containing substrate;
   a silicide-containing bond coat layer overlying the substrate;
   a silica scale layer adjacent to and overlaying the bond coat layer, wherein the silica scale layer is formed by preoxidizing a portion of the bond coat layer and has a thickness of from about 0.5 to about 50 microns; and
   an environmental barrier coating overlying the bond coat layer, wherein the environmental barrier coating comprises a corrosion resistant outer layer adjacent to and overlaying the silica scale layer and comprising a corrosion resistant metal silicate, wherein the corrosion resistant metal silicate is formed by reaction of a metal source with the silica scale layer.

* * * * *